(12) United States Patent
Mang et al.

(10) Patent No.: US 10,851,906 B2
(45) Date of Patent: Dec. 1, 2020

(54) VALVE AND METHOD FOR MANUFACTURING A VALVE

(71) Applicant: SVM Schultz Verwaltungs-GmbH & Co. KG, Memmingen (DE)

(72) Inventors: Helmut Mang, Memmingen (DE); Florian Schreiber, Weissenhorn (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 109 days.

(21) Appl. No.: 15/886,569

(22) Filed: Feb. 1, 2018

(65) Prior Publication Data

US 2018/0224021 A1 Aug. 9, 2018

(30) Foreign Application Priority Data

Feb. 3, 2017 (DE) .................. 10 2017 102 184

(51) Int. Cl.
| | |
|---|---|
| *F16K 31/16* | (2006.01) |
| *F16K 27/04* | (2006.01) |
| *F16K 31/06* | (2006.01) |
| *F16K 11/07* | (2006.01) |
| *B23P 11/00* | (2006.01) |
| *F16H 61/02* | (2006.01) |

(52) U.S. Cl.
CPC .......... *F16K 31/0613* (2013.01); *B23P 11/00* (2013.01); *F16K 11/0704* (2013.01); *F16K 11/0716* (2013.01); *F16K 27/041* (2013.01); *F16K 27/048* (2013.01); *F16H 2061/0253* (2013.01); *Y10T 137/87233* (2015.04)

(58) Field of Classification Search
CPC .............. F16K 31/061; F16K 31/0603; F16K 31/0613; F16K 31/0617; F16K 27/048; F16K 11/0704; F16K 11/0716; F16K 27/041; B23P 15/001; F16H 2061/0253
See application file for complete search history.

(56) References Cited

U.S. PATENT DOCUMENTS

| | | | |
|---|---|---|---|
| 5,911,400 A | 6/1999 | Niethammer et al. | |
| 8,973,611 B2 * | 3/2015 | Schudt ................ | F15B 13/0442 137/625.67 |
| 2007/0158606 A1 | 7/2007 | Oishi | |
| 2013/0277586 A1* | 10/2013 | Van Weelden ...... | F16K 31/0613 251/129.15 |
| 2016/0103455 A1 | 4/2016 | Bowden | |

(Continued)

FOREIGN PATENT DOCUMENTS

| | | |
|---|---|---|
| CN | 105090593 A | 11/2015 |
| CN | 106090307 A | 11/2016 |
| CN | 106151497 A | 11/2016 |

(Continued)

OTHER PUBLICATIONS

Extended European Search Report for European Application No. 18154274.7, Search completed Jun. 20, 2018, dated Jul. 4, 2018, 11 Pgs.

(Continued)

*Primary Examiner* — Umashankar Venkatesan
(74) *Attorney, Agent, or Firm* — KPPB LLP

(57) ABSTRACT

The invention refers to a valve, in which a valve housing is deformed and thereby a sliding sleeve pushes against a housing. The invention also refers to a method for manufacturing such a valve.

22 Claims, 2 Drawing Sheets

(56) References Cited

U.S. PATENT DOCUMENTS

2017/0167617 A1* 6/2017 Layne .................. B23P 15/001
2019/0108934 A1* 4/2019 Nagasaki .................. H01F 7/13

FOREIGN PATENT DOCUMENTS

| CN | 205896343 U | 1/2017 |
|---|---|---|
| DE | 19535945 A1 | 4/1997 |
| DE | 10205074 A1 | 8/2003 |
| DE | 102005047357 A1 | 4/2007 |
| DE | 102007042046 A1 | 3/2009 |
| DE | 102010039917 A1 | 3/2012 |

OTHER PUBLICATIONS

Second office action received in Chinese patent application No. 201810103989.7, dated Dec. 13, 2019, 14 pages with English translation.

* cited by examiner

VALVE AND METHOD FOR MANUFACTURING A VALVE

BACKGROUND OF THE INVENTION

The invention refers to a valve, in particular a slide valve, which may be used, in particular, in automatic transmissions of motor vehicles. The invention also refers to a method for manufacturing such a valve.

Valves of various kinds are known. Slide valves may typically assume at least two states, thereby selectively connecting to each other certain connections, such as a pressure port, a work port and a tank port. The flow of a fluid such as a liquid or a gas may thus be controlled.

BRIEF SUMMARY OF THE INVENTION

The object of the invention is to provide known valves in alternative forms, such as in a form which is easier to manufacture. These valves are also known as pressure regulation valves. In this case they have various positions.

This object is achieved according to the invention by a valve and a method according to the respective independent claims. Advantageous elaborations may be obtained from the respective dependent claims, for example.

The invention refers to a valve, in particular a slide valve, having a longitudinal axis. The valve has a housing, a valve housing and a sliding sleeve, which extends along the longitudinal axis.

The housing has at least one bearing surface, against which the sliding sleeve rests.

The valve housing at least partially surrounds the sliding sleeve and is connected in a shear-resistant manner to the sliding sleeve, at least in the direction of the housing.

The valve housing has a holding edge, which lies radially on the outer side with respect to the longitudinal axis.

The housing has at least one holding element, which surrounds the holding edge, so that the valve housing is tensioned along the longitudinal axis by elastic deformation of the valve housing towards the housing.

By means of such a valve it is possible to fix the positions of housing, valve housing and sliding sleeve to each other in a particularly simple and reliable way.

The housing is preferably made of metal. The valve housing is preferably made of plastic materials. The sliding sleeve is preferably made of metal. Such materials have been proven to be advantageous for typical applications.

The housing preferably has a fixing recess for the sliding sleeve, wherein the bearing surface is positioned inside the fixing recess. The sliding sleeve may thus be advantageously stabilized.

According to an embodiment, the valve housing completely encloses the sliding sleeve. Alternatively, it may also enclose the sliding sleeve only partially.

Preferably, the valve housing is form-fittingly connected to the sliding sleeve. This allows for a stable connection which is easy to manufacture. However, other connection types may also be used correspondingly, such as in particular material fittings or force-fittings.

According to an embodiment, the sliding sleeve has a circumferentially surrounding external groove, in which a complementary bead of valve housing engages for forming a form-fitting connection.

According to an embodiment, the sliding sleeve has a circumferentially surrounding external bead, which engages a complementary groove of valve housing in order to form a form-fitting connection.

The holding edge is preferably annularly shaped. This allows for a simple enclosing of the holding edge. The holding edge may also be part of a disc-shaped part of the valve housing. It may be provided in the form of a radial protrusion of the valve housing.

The holding elements are provided, in an embodiment, as radially inwards directed protrusions with respect to the longitudinal axis. According to a further embodiment, the holding element is a ring, which is axially protruding from the housing.

The holding elements preferably form an angle of 40° to 50°, in particular 45°, with respect to the longitudinal axis. Thus, in practice, a good holding action may be achieved.

According to an advantageous embodiment, the holding edge has a rim, which is oblique with respect to the longitudinal axis, against which the holding elements rest. Thus, the bending angle of holding elements is reduced.

The oblique rim of the holding edge preferably forms an angle of 40° to 50°, in particular 45°, with respect to the longitudinal axis. The holding elements may be advantageously bent or caulked by a corresponding quantity.

The one or more holding elements may be advantageously caulked with the holding edge. This allows for an easy manufacturing and a reliable hold.

The valve housing is preferably axially elastically deformable in the region of the holding edge relative to the longitudinal axis. Moreover, the valve housing is elastically deformable on the radial inner side of the holding edge relative to the longitudinal axis. This may be achieved, for example, by a suitable material choice and/or by a suitable forming.

Before the deformation, a distance or air gap of the valve housing to the housing may be particularly provided, in order to provide space for deformation.

The valve housing may preferably have a front side, which is facing the housing, and which, due to the elastic deformation, is tilted from an orientation, which is obliquely directed with respect to the longitudinal axis.

The front side may in particular tilted by less than 5°, in particular less than 3°, from the orientation, which is oblique to the longitudinal axis.

The sliding sleeve is preferably pressed against the bearing surface due to the elastic deformation. The position of the sliding sleeve relative to the housing is thus fixed.

According to an embodiment, a control piston, which is movable against the force of a return spring, is arranged within the sliding sleeve. This corresponds to a typical embodiment of a slide valve.

It is however to be noted that the inventive embodiment may also be used for other types of valves.

According to an advantageous embodiment, the housing has an electromagnet for driving the control piston, the bearing surface is arranged on a magnet core of the electromagnet and the magnet core has a pass-through bore in the region of the bearing surface, which receives an armature rod interacting with the armature of the electromagnet. This corresponds to a typical embodiment of an electromagnetically actuated valve.

It is however to be noted that the inventive embodiment may also be used for other types of drives.

The invention also refers to a method for manufacturing a valve. The valve may in particular be an inventive valve, wherein all herein described embodiments and variants may be used.

The method has following steps:
providing a housing, which is at least provided with a bearing surface and a number of holding elements, providing a valve housing, which has a holding edge, providing a sliding sleeve, which extends along a longitudinal axis, arranging the sliding sleeve in such a way that the sliding sleeve rests against the bearing surface of the housing, arranging the valve housing in such a way that it at least partially encloses the sliding sleeve and is connected with the sliding sleeve, so that the valve housing is blocked on the sliding sleeve, at least against sliding along the longitudinal axis towards the housing, and that the holding edge is positioned radially on the outer side with respect to the longitudinal axis, deforming the holding elements, so that they enclose the holding edge, so that the valve housing is tensioned along the longitudinal axis towards the housing by elastically deforming the valve housing.

By means of such a method a valve may be advantageously manufactured, wherein the above-mentioned advantages may be achieved.

Preferably, a front surface of the valve housing facing the housing is initially applied at a distance or with an air gap with respect to the housing, wherein only in case of an elastic deformation, the distance or air gap is at least partially reduced. This allows for the advantageous provision of a space for the elastic deformation.

In this context it is to be noted that all characteristics and properties described with reference to the device as well as all procedures may be correspondingly transferred to the formulation of the inventive method and may be used in the sense of the invention and are to be considered disclosed herein. The same holds inversely, i.e. all constructive or device-related characteristics cited with regard to the method may be considered and claimed also in the context of the device claims and are also part of the disclosure.

BRIEF DESCRIPTION OF THE VARIOUS VIEWS IN THE DRAWINGS

The invention is schematically represented in particular in an exemplary embodiment in the drawing. In particular:

DETAILED DESCRIPTION OF THE PREFERRED EMBODIMENT

Figure 1:
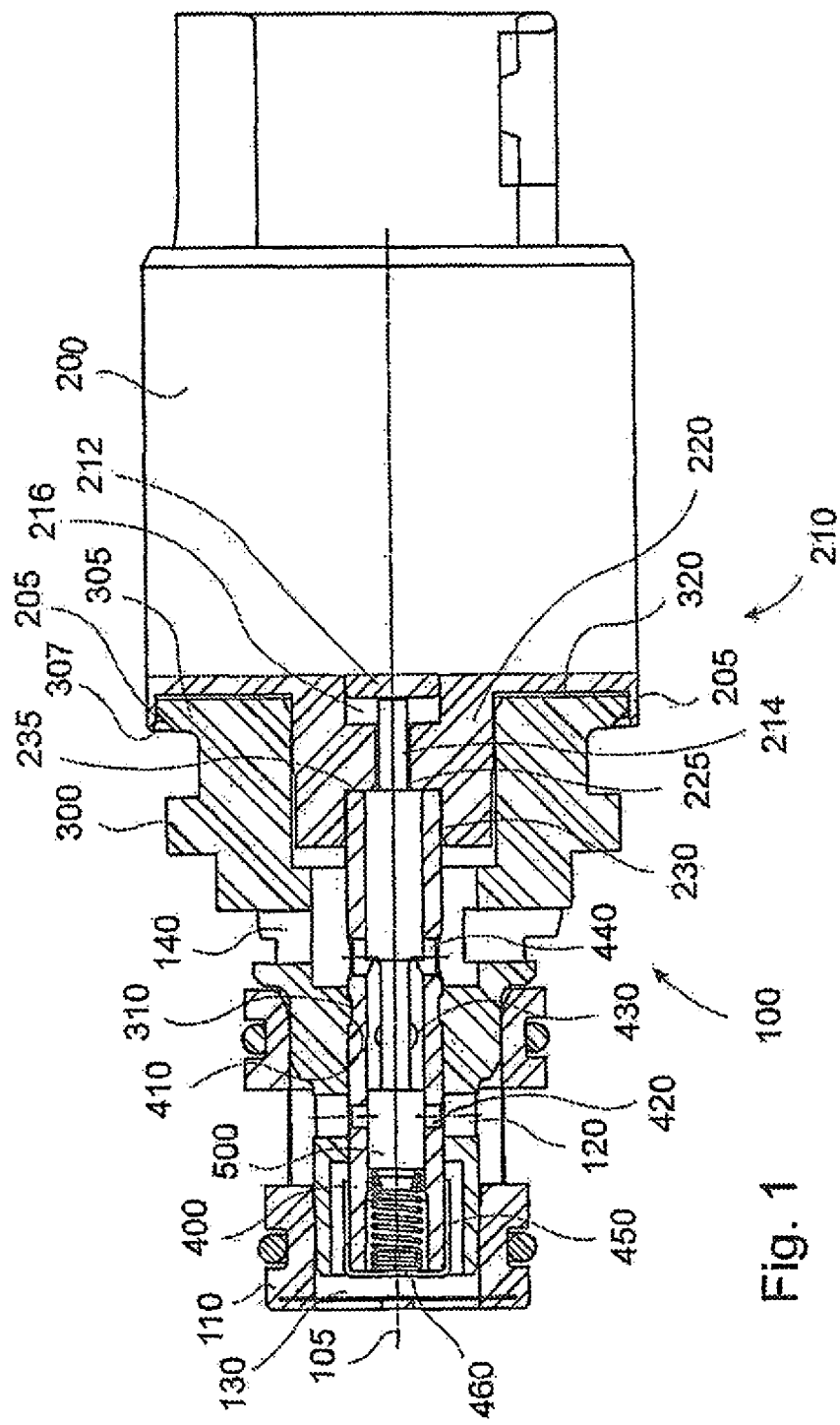
FIG. 1 shows components of an inventive valve during its manufacturing.

In the figures, the same or corresponding elements are respectively provided with the same reference numerals and thus are not described again each time, except when necessary. The disclosures comprised by the entire description are thus correspondingly transferable to same parts with same reference numerals or same component definitions. The position information chosen in the description, such as, for example, above, below, lateral, etc., are referred to the presently described and illustrated figure and may be correspondingly transferred to the new position in case of a change of position. Individual characteristics or combinations of characteristics from the different examples shown and described may also represent independent inventive solution or solutions according to the invention.

FIG. 1 shows components of a valve 100 according to an example of the invention during manufacturing.

The valve 100 extends along a longitudinal axis 105. The valve 100 essentially has a rotational symmetry about the longitudinal axis 105, wherein deviations from rotational symmetry are present, such as in the case of connections.

The valve 100 has a housing 200, which is shown in FIG. 1 from outside.

In the housing 200 an electromagnet 210 is provided. This electromagnet is only partially visible in figures since it is substantially covered by the housing 200.

The electromagnet 210 has an armature 212. An armature rod 214 is positioned on the latter. The armature 212 is linearly movable within an armature space 216 along the longitudinal axis 105.

In order to drive the armature 212, the electromagnet 210 is provided with a coil, that is covered by the housing 200 and thus not visible in figures.

The electromagnet 210 also has a magnet core 220. The magnet core protrudes, as shown, slightly from housing 200 and closes the cup-shaped housing 200 in the direction of the valve housing 300.

In the magnet core 220 a fixing recess 230 is provided. The function of this recess is detailed in the following. In the fixing recess 230 a bearing surface 235 is formed, which forms the bottom of the fixing recess 230.

In the magnet core 220 a pass-through bore 225 is also provided, which connects the armature space 216 with the fixing recess 230. The armature rod 214 extends from armature 212 through the pass-through bore 225.

The housing 200 in the present case is made of metal.

The valve 100 also has a valve housing 300. This housing is made of plastic material in the present case. The valve housing 300 is preferably an injection molded component made of plastic.

The valve 100 also has a sliding sleeve 400. This sleeve is presently made of metal.

The valve housing 300 encloses the sliding sleeve 400. The sliding sleeve 400 is oriented in such a way that it extends along the longitudinal axis 105.

The sliding sleeve 400 is received inside the already mentioned fixing recess 230 and is stabilized by the same in directions transversal to the longitudinal axis 105. The sliding sleeve 400 rests against the bearing surface 235 and its movement to the right is prevented by the bearing surface 235.

On the outer side of the sliding sleeve 400 a circumferential surrounding groove 410 is formed. A bead 310, which is complementary to the groove, is formed on the valve housing 300, wherein the bead engages the groove 410. The sliding sleeve 400 and the valve housing 300 are thus connected to each other by form-fitting. In particular, the sliding sleeve 400 cannot be displaced anymore relative to the valve housing 300 along the longitudinal axis 105. This is true in both directions along the longitudinal axis 105, in particular though towards the housing 200. This can also be expressed by saying that the valve housing 300 is prevented from moving on the sliding sleeve 400.

The valve housing 300 has a front side 320, which is directed towards the housing 200.

The valve housing 300 is provided with a holding edge 305 on the radial outer side with respect to the front side 320. The holding edge has an annular shape. It is provided, on its left facing side in figures, with an oblique rim 307. This rim forms an angle of about 45° with the longitudinal axis 105, as shown. This is valid for the cross section shown but would also be true for any other cross section, i.e. in case of rotation of the cross-sectional surface about the longitudinal axis 105.

The housing 200 has a plurality of holding elements 205 on the left side. These elements are protruding elements formed on the housing 200. Since in FIG. 1, a still uncomplete mounting state of valve 100 is shown, the holding elements 205 are oriented in a horizontal direction. In the cross-sectional view of FIG. 1, two of the holding elements 205 are visible.

The holding elements 205 may be radially and inwardly caulked, in order to engage the oblique rim 307 and provide a connection between the valve housing 300 and the housing 200. This is described in the following with reference to FIG. 2.

The valve 100 has a pressure port 120, a working port 130 and a tank port 140.

The pressure port 120 is formed in a radial and lateral position on valve 100. It is used for supplying a pressurized fluid, which has to be controlled by valve 100. The fluid may be a gas or a liquid, for example.

The working port 130 is formed on the front side. It is laterally delimited by a filter basket 110, which sits on the valve housing 300. The filter basket 110 carries a filter, by which a fluid exiting the working port 130 may be filtered. A filter is also provided for the pressure port 120.

The fluid exiting the working port 130 may be used for different control or driving tasks, such as in an automatic transmission of a motor vehicle.

The tank port 140 is also formed on a radial side of valve 100. The tank port may be connected to a conduit leading to a tank, in order to return the fluid to the tank.

The working port 130 is connected with a working port opening 430 in the sliding sleeve 40. The working port opening 430 is partially covered by the control piston 500. The connection between working port opening 430 and working port, with respect to the longitudinal axis 105, runs in the axial direction and is rotated by 90° relative to the view of FIG. 1/FIG. 2.

In the sliding sleeve 400 a pressure port opening 420 is also formed. This pressure port opening 420 is connected with the pressure port 120 and ensures that the fluid flows from the pressure port 120 into the sliding sleeve 400.

In the sliding sleeve 400 a tank port opening 440 is also formed, which is connected with the tank port 140. The tank port opening 440 ensures that the fluid flows from inside the sliding sleeve 400 into the tank port 140.

In the sliding sleeve 400 the working port opening 430 is positioned between the tank port opening 440 and the pressure port opening 420.

A control piston 500 is provided within the sliding sleeve 400. This piston is structured, as shown, so that it may selectively connect ports 120, 130, 140 to each other. It is provided in the central region with a tapering for forming a flow channel. The flow channel is delimited by control edges of the control piston 500.

In the position shown in FIG. 1, the working port 130 is connected with the tank port 140, while the pressure port 120 is blocked. If the control piston 500 is moved to the left by the electromagnet 210, then the working port 130 is connected with the pressure port 120, while the tank port 140 is blocked. This corresponds to the usual function of a valve. In the described embodiment, the valve is thus a slide valve. It is however to be noted that the inventive embodiment may be used not only in the case of side valves, but also in all types of valves. The description in the context of a slide valve is here only provided for illustrative purposes.

A supporting cap 450 is applied on the left end of sliding sleeve 400. This cap closes the sliding sleeve 400.

A return spring 460 is provided between the support cap 450 and the control piston 500. The spring bears against the support cap 450 and pushes the control piston 500 to the right. Thus, if the electromagnet 210 does not provide any force, the control piston 500 remains in the position shown in FIG. 1. If, however, the already cited coil of the electromagnet 210 is energized with a current, then the armature 212 is moved to the left. This movement is transmitted to the control piston 500 through the armature rod 214, whereby also the piston is moved to the left against the force provided by the return spring 460. Thus, the valve 100 may be operated in the usual way.

Since the valve 100 in FIG. 1 is still in an incompletely mounted state, a discernible gap remains between the front side 320 and the housing 200. This gap is used for providing a space for a deformation of the valve housing 300, as described in the following.

Figure 2:
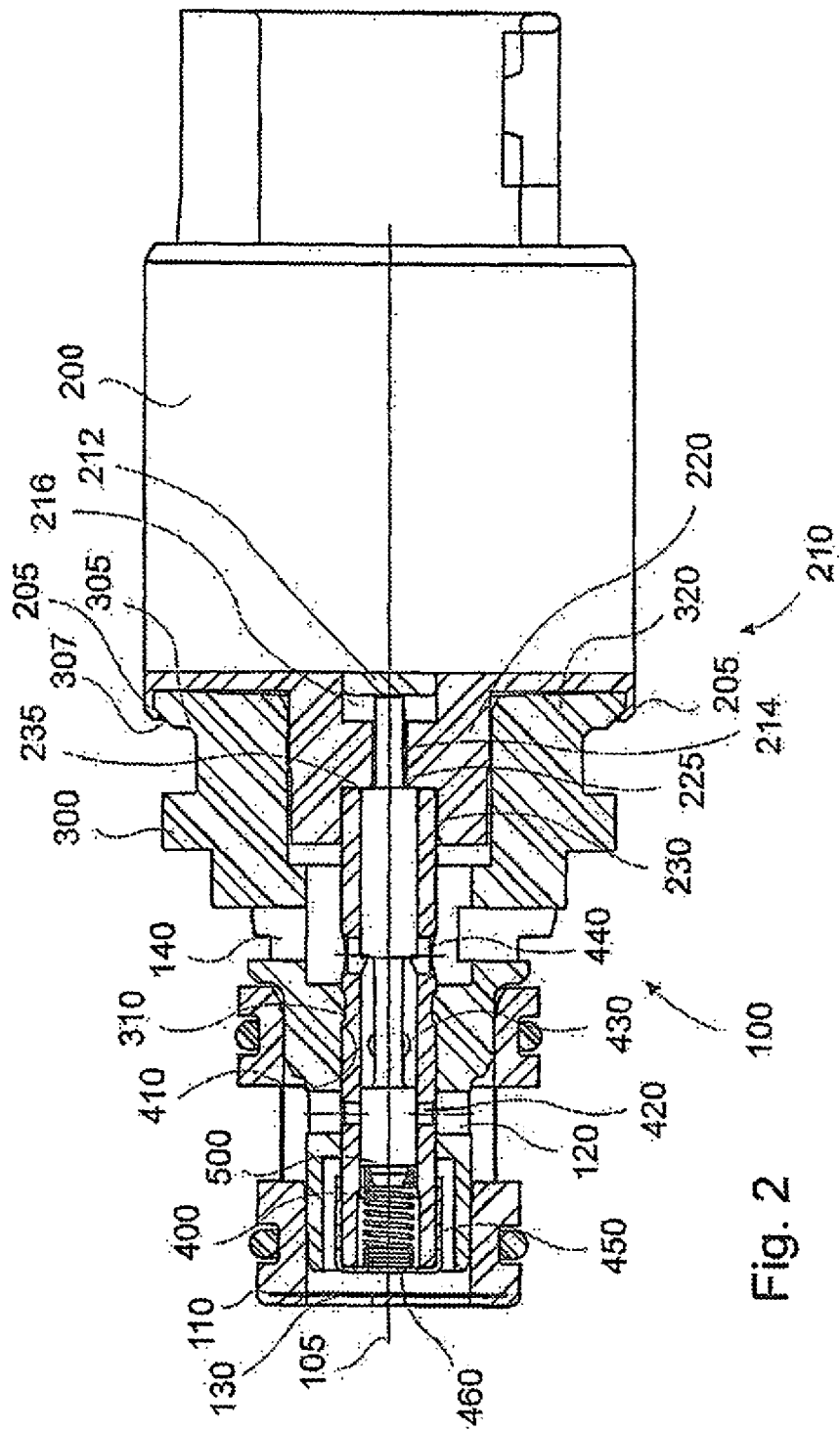
FIG. 2 shows a valve according to the invention.

FIG. 2 shows the valve 100 in an assembled state. Contrary to the state shown in FIG. 1, the holding elements 205 are radially folded inwards, so that they rest against the oblique rim 307 of the valve housing 300.

By means of the holding elements 205, a force directed to the right is exerted onto the valve housing 300. This causes the valve housing 300 to slightly elastically deform to the right along the front side 320, on the radial outer side. The plastic material forming the valve housing 300, in the present case, has the characteristic of allowing such an elastic deformation. The space is provided, as already said, by a gap, which is initially present.

An elastic force is thus exerted on the valve housing 300, which causes a force, directed to the right, to be exerted on the sliding sleeve 400, in particular on the bead 310, through which the valve housing 300 is connected with the sliding sleeve 400.

Due to this force, the sliding sleeve 400 also pushes against the bearing surface 235 of the magnet core 220. The position relationships of housing 200, valve housing 300 and sliding sleeve 400 are thus permanently defined.

The transition from the state of FIG. 1 to the state of FIG. 2 may in particular be achieved by caulking. The holding elements 205 are bent inwardly in this case.

In the following, possible characteristics of the proposal are presented in a structured form. The following structurally presented characteristics may be arbitrarily combined with each other and may be contained in the claims of the application in any desired combination. It will be apparent to the skilled in the art that the invention is already obtained from the subject matter having the smallest number of characteristics. In particular, in the following, advantageous or possible embodiments are provided, which however are not the only possible embodiments of the invention.

The invention comprises:

A valve, in particular a slide valve, having a longitudinal axis, which is provided with
- a housing (200),
- a valve housing (300), and
- a sliding sleeve (400), which extends along the longitudinal axis (105),
- wherein the housing (200) has at least one bearing surface (235), against which the sliding sleeve (400) rests,
- wherein the valve housing (300) at least partially surrounds the sliding sleeve (400) and is connected in a shear-resistant manner to the sliding sleeve (400) at least in the direction of the housing (200),
- wherein the valve housing (300) has a holding edge (305) which lies radially on the outer side with respect to the longitudinal axis (105) and
- wherein the housing (200) has at least one holding element (205), which surrounds the holding edge (305), so that the valve housing (300) is tensioned along the longitudinal axis (105) by elastic deformation of the valve housing (300) towards the housing (200).

The aforementioned valve, wherein the housing (200) is made of metal.

The aforementioned valve, wherein the valve housing (300) is made of plastic material.

The aforementioned valve, wherein the sliding sleeve (400) is made of metal.

The aforementioned valve, wherein the housing (200) has a fixing recess (230) for the sliding sleeve (400), wherein the bearing surface (235) is positioned inside the fixing recess (230).

The aforementioned valve, wherein the valve housing (300) completely encloses the sliding sleeve (400).

The aforementioned valve, wherein the valve housing (300) is form-fittingly connected to the sliding sleeve (400).

The aforementioned valve, wherein the sliding sleeve (400) has a circumferentially surrounding external groove (410), in which a complementary bead (310) of valve housing (300) engages for forming a form-fitting connection.

The aforementioned valve, wherein the sliding sleeve (400) has a circumferentially surrounding external bead, which engages a complementary groove of valve housing (300) in order to form a form-fitting connection.

The aforementioned valve, wherein the holding edge (305) is annularly shaped.

The aforementioned valve, wherein the holding elements (205) are formed by protrusions, which are directed radially inwards with respect to the longitudinal axis (105), or the holding element (205) is formed by a ring which is axially protruding on the housing (200).

The aforementioned valve, wherein the holding elements (205) form an angle of 40° to 50°, in particular 45°, with respect to the longitudinal axis (105).

The aforementioned valve, wherein the holding edge (305) has a rim (307), which is oblique with respect to the longitudinal axis (105), against which the holding elements (205) rest.

The aforementioned valve, wherein the oblique rim of the holding edge (305) forms an angle of 40° to 50°, in particular of 45°, with respect to the longitudinal axis (105).

The aforementioned valve, wherein the one or more holding elements (205) is/are caulked with the holding edge (305).

The aforementioned valve, wherein the valve housing (300) is axially elastically deformable in the region of the holding edge (305) relative to the longitudinal axis (105).

The aforementioned valve, wherein the valve housing (300) is elastically deformable on the radial inner side of the holding edge (305) with respect to the longitudinal axis (105).

The aforementioned valve, wherein the valve housing (300) has a front side (320) facing the housing (200), which, due to elastic deformation, is tilted from an orientation, which is obliquely directed with respect to the longitudinal axis (105).

The aforementioned valve, wherein the front side (320) is tilted from the orientation, which is oblique with respect to the longitudinal axis (105), by less than 5°, in particular less than 3°.

The aforementioned valve, wherein the sliding sleeve (400) is pressed against the bearing surface (235) due to the elastic deformation.

The aforementioned valve, wherein a control piston (500), which is movable against the force of a return spring, is arranged within the sliding sleeve (400).

The aforementioned valve, wherein the housing (200) has an electromagnet (210) for driving the control piston (500), the bearing surface (235) is arranged on a magnet core (220) of the electromagnet (210) and the magnet core (220) has a pass-through bore (225) in the region of the bearing surface, which receives an armature rod (214) interacting with the armature (212) of the electromagnet (210).

A method for manufacturing a valve, in particular the aforementioned valve, wherein the method has the following steps:
  providing a housing, which is at least provided with a bearing surface and a number of holding elements,
  providing a valve housing, which has a holding edge,
  providing a sliding sleeve, which extends along a longitudinal axis,
  arranging the sliding sleeve in such a way that the sliding sleeve rests against the bearing surface of the housing,
  arranging the valve housing in such a way that it at least partially encloses the sliding sleeve and is connected with the sliding sleeve, so that the valve housing is blocked on the sliding sleeve, at least against sliding along the longitudinal axis towards the housing, and that the holding edge is positioned radially on the outer side with respect to the longitudinal axis,
  deforming the holding elements, so that they enclose the holding edge, so that the valve housing is tensioned along the longitudinal axis towards the housing by elastically deforming the valve housing.

Although the invention has been described with reference to detailed exemplary embodiments, which are provided in the most precise detail, it is to be noted that this is only provided for illustrative purposes, and that the invention is not necessarily limited thereto, since alternative exemplary embodiments and procedures are obvious to the skilled in the art with reference to the disclosure. Variants are thus considered, which may be put into practice without departing from the content of the described invention.

The invention claimed is:

1. A valve having a longitudinal axis comprising
a housing,
a valve housing, and
a sliding sleeve, which extends along the longitudinal axis,
wherein the housing has at least one bearing surface, against which the sliding sleeve rests,
wherein the valve housing at least partially surrounds the sliding sleeve and is connected in a shear-resistant manner to the sliding sleeve at least in the direction of the housing,
wherein the valve housing has a holding edge which lies radially on the outer side with respect to the longitudinal axis and
wherein the housing has at least one holding element, which surrounds the holding edge, so that the valve housing is tensioned along the longitudinal axis by elastic deformation of the valve housing towards the housing, wherein the valve housing has a front side facing the housing, which due to elastic deformation, is tilted from an orientation, which is obliquely directed with respect to the longitudinal axis, and wherein the front side is tilted from the orientation, which is oblique with respect to the longitudinal axis, by less than 5°.

2. The valve of claim 1, wherein the housing is made of metal, and/or the valve housing is made of plastic material and/or the sliding sleeve is made of metal.

3. The valve of claim 1, wherein the housing has a fixing recess for the sliding sleeve, wherein the bearing surface is positioned inside the fixing recess.

4. The valve of claim 1, wherein the valve housing completely encloses the sliding sleeve.

5. The valve of claim 1, wherein the valve housing is form-fittingly connected to the sliding sleeve.

6. The valve of claim 1, wherein the sliding sleeve has a circumferentially surrounding external groove, in which a complementary bead of valve housing engages for forming a form-fitting connection.

7. The valve of claim 1, wherein the sliding sleeve has a circumferentially surrounding external bead, which engages a complementary groove of valve housing in order to form a form-fitting connection.

8. The valve of claim 1, wherein the holding edge is annularly shaped.

9. The valve of claim 1, wherein the holding elements are formed by protrusions, which are directed radially inwards with respect to the longitudinal axis, or the holding element is formed by a ring which is axially protruding on the housing.

10. The valve of claim 1, wherein the holding elements form an angle of 40° to 50° with respect to the longitudinal axis.

11. The valve of claim 1, wherein the holding edge has a rim, which is oblique with respect to the longitudinal axis, against which the holding elements rest.

12. The valve of claim 11, wherein the oblique rim of the holding edge forms an angle of 40° to 50° with respect to the longitudinal axis.

13. The valve of claim 11, wherein the holding elements form an angle of 45° with respect to the longitudinal axis.

14. The valve of claim 11, wherein the oblique rim of the holding edge forms an angle of 45° with respect to the longitudinal axis.

15. The valve of claim 11, wherein the front side is tilted from the orientation, which is oblique with respect to the longitudinal axis, by less than 3°.

16. The valve of claim 1, wherein the one or more holding elements is/are caulked with the holding edge.

17. The valve of claim 1, wherein the valve housing is axially elastically deformable in the region of the holding edge relative to the longitudinal axis.

18. The valve of claim 1, wherein the valve housing is elastically deformable on the radial inner side of the holding edge relative to the longitudinal axis.

19. The valve of claim 1, wherein the sliding sleeve is pressed against the bearing surface due to the elastic deformation.

20. The valve of claim 1, wherein a control piston, which is movable against the force of a return spring, is arranged within the sliding sleeve.

21. The valve of claim 1, wherein the valve is a sliding valve.

22. A method for manufacturing a valve, wherein the method has the following steps:
providing a housing, which is at least provided with a bearing surface and a number of holding elements,
providing a valve housing, which has a holding edge which lies radially on an outer side with respect to a longitudinal axis and wherein the valve housing has a front side facing the housing, which due to elastic deformation, is tilted from an orientation, which is obliquely directed with respect to the longitudinal axis, and wherein the front side is tilted from the orientation, which is oblique with respect to the longitudinal axis, by less than 5°,
providing a sliding sleeve, which extends along the longitudinal axis,
arranging the sliding sleeve in such a way that the sliding sleeve rests against the bearing surface of the housing,
arranging the valve housing in such a way that it at least partially encloses the sliding sleeve and is connected with the sliding sleeve in a shear-resistant manner at least in the direction of the housing, so that the valve housing is blocked on the sliding sleeve, at least against sliding along the longitudinal axis towards the housing, and that the holding edge is positioned radially on the outer side with respect to the longitudinal axis,
deforming the holding elements, so that they enclose the holding edge, so that the valve housing is tensioned along the longitudinal axis towards the housing by elastically deforming the valve housing.

* * * * *